(12) United States Patent
Bache et al.

(10) Patent No.: US 11,315,448 B2
(45) Date of Patent: Apr. 26, 2022

(54) AIRCRAFT OVERHEAD SIGNS

(71) Applicant: Saf-T-Glo Limited, Cwmbran (GB)

(72) Inventors: Rhian Bache, Cwmbran (GB); Sean O'Kell, Cwmbran (GB)

(73) Assignee: SAF-T-GLO LIMITED, Swaffham (GB)

( * ) Notice: Subject to any disclaimer, the term of this patent is extended or adjusted under 35 U.S.C. 154(b) by 0 days.

(21) Appl. No.: 16/148,625

(22) Filed: Oct. 1, 2018

(65) Prior Publication Data
US 2019/0103041 A1    Apr. 4, 2019

(30) Foreign Application Priority Data
Oct. 2, 2017  (GB) .................................... 1716086.2

(51) Int. Cl.
*G09F 13/08* (2006.01)
*G09F 21/10* (2006.01)
(Continued)

(52) U.S. Cl.
CPC .............. *G09F 13/08* (2013.01); *G09F 13/20* (2013.01); *G09F 21/10* (2013.01); *B64D 2045/007* (2013.01); *F21W 2106/00* (2018.01); *F21Y 2115/10* (2016.08); *G09F 13/044* (2021.05); *G09F 2013/222* (2013.01)

(58) Field of Classification Search
CPC .......... G09F 13/08; G09F 13/20; G09F 21/10; G09F 13/044; F21W 2106/00; B64D 2045/007
See application file for complete search history.

(56) References Cited

U.S. PATENT DOCUMENTS 6,268,801 B1 *  7/2001  Wu ........................ G08G 1/095
                                                    340/815.45
6,656,566 B1 * 12/2003  Kuykendall ........... G02B 5/124
                                                        428/138
(Continued)

FOREIGN PATENT DOCUMENTS

EP      1793261       6/2007
EP      2 626 850     8/2013
(Continued)

OTHER PUBLICATIONS

Delta DC-9-51 Cabin at Cruising Altitude, The Deltaville / YouTube; Nov. 17, 2012. See www.youtube.com/watch?v=dj7dkqZxaxA@ 27 seconds.
(Continued)

*Primary Examiner* — Gary C Hoge
(74) *Attorney, Agent, or Firm* — Foley & Lardner LLP (57) ABSTRACT

An aircraft passenger service unit signage placard adapted to be retrofitted to a passenger service unit, the placard comprising at least a first signage area and a second signage area, wherein the first signage area is arranged to be illuminated by a switchable illumination means in the passenger service unit and wherein the placard comprises a first and a second layer and photoluminescent material is provided on at least one of the first and second layers of the placard in the second signage area, the second signage area having at least one first icon illuminated by the photoluminescent material such that the first icon is always illuminated in use.

16 Claims, 3 Drawing Sheets

(51) Int. Cl.
  *G09F 13/20*    (2006.01)
  *G09F 13/22*    (2006.01)
  *G09F 13/04*    (2006.01)
  *F21Y 115/10*   (2016.01)
  *F21W 106/00*   (2018.01)
  *B64D 45/00*    (2006.01)

(56) References Cited

U.S. PATENT DOCUMENTS

| | | | | |
|---|---|---|---|---|
| 7,412,790 B2* | 8/2008 | Riopel | ............... | G02B 6/005 |
| | | | | 40/542 |
| 2001/0053071 A1* | 12/2001 | Yoda | ............... | G09F 13/08 |
| | | | | 362/23.07 |
| 2002/0015309 A1* | 2/2002 | Stokes | ............... | B64D 25/00 |
| | | | | 362/471 |
| 2004/0055193 A1* | 3/2004 | Broelemann | ............... | G09F 13/04 |
| | | | | 40/564 |
| 2006/0181105 A1* | 8/2006 | Puschmann | ............... | G08B 5/221 |
| | | | | 296/65.01 |
| 2007/0097664 A1* | 5/2007 | Stokes | ............... | G09F 13/22 |
| | | | | 362/84 |
| 2010/0218405 A1* | 9/2010 | Adams | ............... | G09F 7/12 |
| | | | | 40/320 |
| 2011/0114891 A1* | 5/2011 | Isobe | ............... | C09D 11/037 |
| | | | | 252/301.36 |
| 2013/0180139 A1* | 7/2013 | Underwood | ............... | G09F 13/20 |
| | | | | 40/543 |
| 2013/0199064 A1* | 8/2013 | O'Kell | ............... | G09F 13/18 |
| | | | | 40/542 |
| 2015/0197180 A1* | 7/2015 | Salter | ............... | F21S 43/16 |
| | | | | 362/510 |

FOREIGN PATENT DOCUMENTS

| | | |
|---|---|---|
| EP | 2 868 963 | 5/2015 |
| FR | 2800023 | 4/2001 |
| GB | 2 545 094 | 6/2017 |
| JP | 6032695 | 2/1985 |
| WO | WO-01/46937 | 6/2001 |
| WO | WO-2008/097151 | 8/2008 |
| WO | WO-2017/089837 | 6/2017 |

OTHER PUBLICATIONS

IPO Search Report dated Mar. 13, 2018, 3pps.
Search Report dated Mar. 8, 2019, 3 pps.

* cited by examiner

AIRCRAFT OVERHEAD SIGNS

CROSS-REFERENCE TO RELATED PATENT APPLICATIONS

The present application claims priority to and the benefit of United Kingdom Priority Application 1716086.2, filed Oct. 2, 2017, the entire disclosure of which, including the specification, drawings, claims and abstract, is incorporated herein by reference in its entirety.

BACKGROUND

This application relates to overhead signs in aircraft, and particularly to signs located in passenger service units.

Typically, aircraft are provided with overhead signs located in a passenger service unit. Overhead signs are used to provide information to the passengers for the duration of the journey. The signs may provide information to passengers such as a no-smoking sign and when seat belts should be fastened. Other information may be provided on the overhead signs.

Such signs are provided in current passenger service units and are illuminated by switchable (on/off) halogen lights arranged to illuminate the signage. In existing passenger service units a light is provided for each sign and each light is independently controllable. It will be appreciated that having a large number of individual bulbs creates a maintenance and service burden.

Aircraft have long service lives and over the period of use it may be desirable to update the cabin interior to provide a more modern appearance. It is also desirable to be able to change the aircraft signage in order to accommodate new requirements and to provide new features in the signage. Additionally it is desirable to reduce maintenance requirements. A problem that can arise is that if safety sign is not operational it may be necessary to close a row of seats with resulting complications for the airline.

It would be advantageous to provide a system that addresses these and other issues as may be apparent to those reviewing the present disclosure.

SUMMARY

According to an exemplary embodiment, there is provided a passenger service unit signage placard adapted to be retrofitted to a passenger service unit, the placard comprising at least a first signage area and a second signage area, wherein the first signage area is arranged to be illuminated by a switchable illumination means in the passenger service unit and wherein the placard comprises a first and a second layer and photoluminescent material is provided on at least one of the first and second layers of the placard in the second signage area, the second signage area having at least one first icon illuminated by the photoluminescent material such that the first icon is always illuminated in use.

According to another exemplary embodiment, there is provided a method of retrofitting signage in an aircraft passenger service unit comprising providing a signage placard adapted to be fitted into an existing aircraft passenger service unit, the signage placard comprising at least a first signage area and a second signage area, wherein the first signage area is arranged to be illuminated by a switchable illumination means in the passenger service unit and wherein the placard comprises a first and a second layer and photoluminescent material is provided on at least one of the first and second layers of the placard in the second signage area the second signage area having at least one first icon illuminated by the photoluminescent material such that the first icon is always illuminated in use, the method comprising removing an existing placard, connecting the signage placard in the passenger service unit and securing the signage placard to the passenger service unit.

BRIEF DESCRIPTION OF THE DRAWINGS

The inventions will now be described by way of example only with reference to the accompanying drawings in which.

DETAILED DESCRIPTION

According to an exemplary embodiment, there is provided a passenger service unit signage placard adapted to be retrofitted to a passenger service unit, the placard comprising at least a first signage area and a second signage area, wherein the first signage area is arranged to be illuminated by a switchable illumination means in the passenger service unit and wherein the placard comprises a first and a second layer and photoluminescent material is provided on at least one of the first and second layers of the placard in the second signage area, the second signage area having at least one first icon illuminated by the photoluminescent material such that the first icon is always illuminated in use.

According to another exemplary embodiment, there is provided a method of retrofitting signage in an aircraft passenger service unit comprising providing a signage placard adapted to be fitted into an existing aircraft passenger service unit, the signage placard comprising at least a first signage area and a second signage area, wherein the first signage area is arranged to be illuminated by a switchable illumination means in the passenger service unit and wherein the placard comprises a first and a second layer and photoluminescent material is provided on at least one of the first and second layers of the placard in the second signage area the second signage area having at least one first icon illuminated by the photoluminescent material such that the first icon is always illuminated in use, the method comprising removing an existing placard, connecting the signage placard in the passenger service unit and securing the signage placard to the passenger service unit.

The first signage area is arranged to be illuminated independently of the second signage area.

In a particular exemplary embodiment, the second signage area is utilized for a "no-smoking" sign. Under current regulations, the "no-smoking" sign has to be illuminated at all times. The second signage area is illuminated by photoluminescent emissions from the photoluminescent material at all times during a flight so meeting the current regulations.

Preferably the first signage area is arranged to be illuminated by switchable illumination means. The illumination means may comprise a standard light bulb. In one exemplary arrangement, a light emitting diode (LED) unit is connected to the existing power supply instead of the standard light bulb. The LED unit may be connected to the existing bi-pin socket in the passenger service unit (PSU). The LED unit is switchable by the aircraft crew in a conventional manner.

In some embodiments, the placard may comprise at least a further signage area. The further signage area may comprise a switchable display. Desirably the switchable display is illuminated by a low energy illumination means connected to a bi-pin socket in the PSU. The low energy illumination means may in one exemplary embodiment comprise at least one LED unit.

In some embodiments, the illumination means may be arranged to illuminate at least the first signage area and the further signage area. In other embodiments, a dedicated respective illumination means may be provided for the first signage area and the further signage area.

The illumination means may comprise an LED unit having one LED or more than one LED. The illumination means may be arranged to be forward emitting or side emitting and are preferably arranged to provide a back light wash to the respective signage area of the placard.

In some embodiments, a light guide may be provided to conduct the light from the illumination means to the icon in at least the first signage area. The light guide may include a light coloring means, which may be a colored filter according to an exemplary embodiment.

It will be appreciated that more than one LED may be provided for a particular signage area. The number of LEDs used may depend on the area of the signage, the power of the LED and the brightness of sign required. A number of LEDs may be combined to control a light color output of the low energy illumination means.

Desirably the permanently lit area has a signage comprising a non-smoking sign. Since all flights are now non-smoking, the non-smoking sign has to be lit at all times, contrary to past requirements in which the non-smoking sign only had to be lit during take-off and landing. Photoluminescent material can provide a constant illumination without drawing on the aircraft electrical power supply so reducing any drain on the electrical supply of the aircraft.

Desirably the placard is adapted to connect to an existing passenger service unit. according to an exemplary embodiment, the placard can be clipped into place in the passenger service unit. The placard and connecting clip may be provided as an assembly.

According to an exemplary embodiment, the placard is provided with a number of signage areas. Desirably each signage area has one or more icons. Icons may provide information for, amongst other things, fastening seat belts, non-smoking, availability of on-flight "WiFi" etc. It will be appreciated that additional icons may be included in further signage areas of the placard. Such icons may depend on the information that is to be conveyed to the passengers and may change over time.

It will be appreciated that as the "no-smoking" icon is illuminated by photoluminescent light that the existing illumination means are able to illuminate at least one alternative icon such as the "WiFi" icon.

In some arrangements, the placard is arranged such that illuminated icons are white. In other embodiments, the placard may be arranged such that one or more illumination icons are colored. Introduction of color to the icons may be by the use of color modifiers such as colored film, or colors may be provided by the use of colored LEDs or other means such as color printing, such as an ink wash screen printed onto the plastic sheet, or a colored filter may be used.

Colors used in the placard can be selected to be airline branding colors or may be selected to match a color scheme of the aircraft interior. In addition "WiFi" icons may be arranged to be illuminated in a blue light. Red illumination may be used to draw attention to icons such as "fasten seatbelt" signs. The non-smoking sign may also be illuminated in red or in an alternative color such as blue.

An LED illumination means is provided in a space between an inner or rear layer and an outer or upper layer. The LED illumination means may be one LED or a plurality of LEDs. The illumination means may provide a white light or a colored light. A colored light can be produced by a selecting an appropriately colored LED or a combination of appropriately colored LEDs. A colored light emission can be achieved by use of a colored film. The colored film may be provided on an upper surface of the outer layer of the placard or between the light source and the signage area. In other embodiments the color modifier may be provided on a surface of the inner layer of the placard. The color modifier may be on either surface of the inner layer.

The colored film can be located adjacent the icon or on the upper surface of the placard.

According to an exemplary embodiment, the placard comprises a plastic sheet structure. According to one particular exemplary embodiment, the placard comprises a number of layers. The placard may further comprise a film. The film may be applied to a plastic sheet and fixed thereto by for example an adhesive. The film may be laminated to a plastic sheet.

In some embodiments, the placard may comprise a printed layer. The printed layer may block transmission of light. Clear portions may allow light to be transmitted. The light may be white light or may be colored by a film or filter.

Icons may be positive shapes or may be negative images formed by a non-transmitting portion. The non-transmitting portion may be created by a printed image or in some cases by a blocking film.

In some embodiments, the placard may have a dark coloration. In other embodiments, the placard may have a cream coloration as a background color. The color of the placard may be selected to complement the aircraft interior design. According to one particular exemplary embodiment, the or each icon has color contrasting to the background color of the placard. The background coloration may be provided by the film or by a printed layer.

In some embodiments, each icon comprises a clear portion of the placard. Each icon may comprise a clear portion of the placard, particularly of the upper layer.

Each icon may comprise a colored film applied to the upper surface of the placard.

Typically the photoluminescent material may be selected to transmit light in yellow or green to blue wavelengths. A colored film may be provided in the placard such that an alternative color is perceived by a passenger. In other embodiments, a printed ink may be applied to a surface of the placard and the colored ink may alter the perceived color of the icon. The printed ink or film or other color modifier may be applied to an inner surface or an outer surface of the upper layer.

In other embodiments, the icon may be formed from a non-transmitting portion of the placard surrounded by a clear portion through which photoluminescent light is transmitted. The non-transmitting portion may be formed by a film or, in a particular exemplary embodiment, by a color print applied to a surface of the placard. In some embodiments, the icon may be formed by a silhouette of the symbol.

It will be appreciated that the use of photoluminescent material to illuminate an icon permanently such as a non-smoking sign during use of the aircraft reduces maintenance requirements as bulbs no longer have to be replaced periodically. In addition a drain on the aircraft electrical supply during flight is also reduced. A weight reduction may in some cases also be achieved although this is not essential as the system provides other more important advantages. Another advantage is that the low energy illumination means such as an LED unit are more reliable than existing incandescent or halogen lights. It is expected that seat row closures will be reduced since there will be fewer occasions when light units are not operational. In addition photoluminescent light is not reliant on an active electrical connection and once charged is always on. It will also be appreciated that as discussed above the illumination of the "no-smoking" sign by photoluminescent material allows the existing illumination means to be utilized for an alternative icon. The existing illumination means is preferably switchable.

In an exemplary embodiment, the placard comprises a number of layers of a plastic material. There are at least two plastic layers. A first and a second plastic layer may be connected together by a layer of adhesive. In other embodiments, the placard may comprise other materials.

In an exemplary arrangement, the first plastic layer comprises a diffuse sheet which forms an outer layer of the placard. The diffuse sheet may provide a more diffuse rather than a directional lighting from the illumination means behind the placard. The first plastic sheet may have a printed layer on a rear surface of the sheet. The printed layer may be screen printed onto the rear surface of the sheet.

In one embodiment, the printed layer may be black or grey. In other embodiments, the printed layer may be white. Alternatively the layer may be printed in other colors.

In an exemplary embodiment, at least a portion of the printed layer aligned with the photoluminescent material is white.

In an exemplary arrangement, the second plastic sheet comprises a clear sheet which comprises an inner layer of the placard. In some arrangements, the second plastic sheet has a color modifier. The color modifier may comprise a color wash applied to a rear surface of the second sheet. The color modifier may in other embodiments comprise a color film or printed inks or dyes. According to a particular exemplary embodiment, the color modifier transmits light in the wavelengths required to charge the photoluminescent material.

According to an exemplary embodiment, the photoluminescent material is applied to the rear surface of the second sheet in at least a portion of the placard corresponding to the second signage area. The photoluminescent material may be charged by light passing through the clear second layer from the environment. Desirably the light also passes through the color modifier.

In some embodiments, the color modifier is arranged such that the icon appears to be one color in day light or ambient light. In dark conditions an outline of the icon may be illuminated by photoluminescent emitted light and the icon may appear to be a different color such as for example blue.

In an exemplary embodiment, the color modifier is applied to the plastic sheet. Icons and airline branding images are applied with this layer. The color modifier is formed by printed inks according to one particular exemplary embodiment.

Desirably photoluminescent material is applied to the second plastic sheet after the color modifier has been applied. It has been found that this arrangement provides an improved image with a clean edge to the photoluminescent material and icon.

It will be appreciated that other means of supplying the photoluminescent material may be utilized. For example, the photoluminescent material may be provided on or in a further layer and may be adhered to one of the plastic sheet layers. Alternatively, a layer of vinyl comprising photoluminescent material may be provided on the placard.

The method of retrofitting signage in an aircraft passenger service unit comprises disconnecting an existing securing clip and removal of an existing placard from an aperture in the passenger service unit, providing a signage placard in accordance an exemplary embodiment and adapted to be fitted into the aperture and having a securing clip fitting the signage placard into the aperture and securing the placard with the clip.

Replacing a conventional placard with a placard in accordance with the various exemplary embodiments discussed herein has an advantage to the airline in increasing the working lifetime of the passenger service unit and significantly reducing the maintenance required to ensure that all of the signs are working. Additionally, each passenger is more reliably provided with appropriate and accurate safety and informational signage. It will also be appreciated that the use of photoluminescent material to illuminate the "no-smoking" sign enables the existing illumination means in the passenger service unit to be utilized to illuminate new and alternative icons such as the availability of WiFi or the marketing or branding signs without replacement of the existing passenger service unit or expensive and complex modification to incorporate additional illumination means.

Desirably the placard is made from non-flammable materials. According to some exemplary embodiments, the placard is made of a scratch resistant material. It is desirable that the placard cannot be damaged by a passenger either deliberately or accidentally.

According to an exemplary embodiment, the placard is arranged to be tamper-proof or tamper-resistant.

Figure 1:
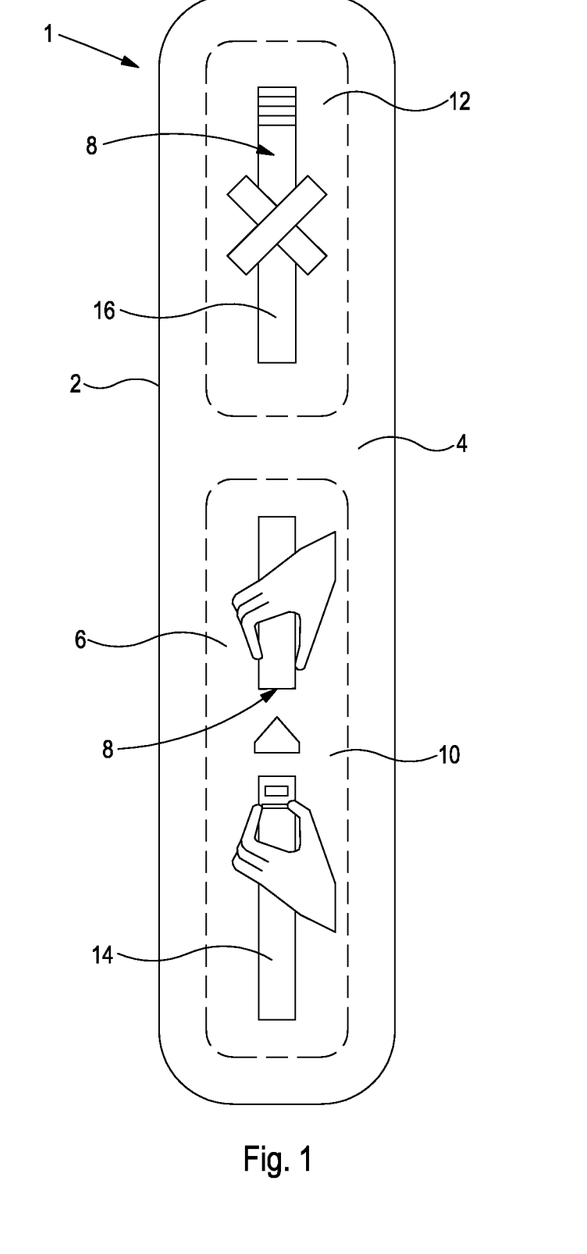
FIG. 1 is a perspective view of a placard showing illuminated signage according to an exemplary embodiment.

Turning now to the accompanying drawing figures, FIG. 1 illustrates a placard 1 in accordance with an exemplary embodiment. The placard 1 has an outer surface 2 comprising a background 4 having a number of signage areas 6.

Each signage area 6 comprises at least one icon 8. The icon 8 may be selected from warning icons such as "fasten seatbelt" signs and "no-smoking" signs or may be informational such as "WiFi" signs. Additional signage may be provided in the form of airline branding or marketing signs.

In this embodiment, the placard comprises a first signage area 10 and a second signage area 12. The placard may also comprise one or more further signage areas in other embodiments.

The first signage area 10 has a first icon 14 comprises a portion of the placard 1 through which light is transmitted. Conveniently any existing bulbs may be replaced with a low energy illumination means, such as an LED unit, arranged to be connectable to a conventional bi pin socket in the passenger service unit prior to connecting the placard into the passenger service unit.

The LED unit may be one LED or a plurality of LEDs. The LED unit may provide a white light or a colored light. A colored light can be produced by a selecting an appropriately colored LED or a combination of appropriately colored LEDs. Alternatively a colored light emission can also be achieved by use of a colored film.

The LED unit can be controlled to be in an off state or an on state by conventional switches in the passenger service unit which are operated by the aircraft crew. It is also envisaged that alternative control means may be used.

The number of LEDs or the brightness of the or each LED is selected such that the icons relating to safety can be readily seen from at least 2 m in darkness.

The second signage area 12 has a second icon 16. In this embodiment the second icon 16 comprises a "no-smoking" icon. The "no-smoking" icon has to be illuminated at all times during use of an aircraft.

The second icon 18 is illuminated by photoluminescent material. In this embodiment, the photoluminescent material is provided on a surface of the placard. In other embodiments a photoluminescent material is provided to the rear of the placard and is arranged to provide a light source to an icon on the placard.

For a "no-smoking" sign it is preferred that the icon is illuminated by photoluminescent material. The photoluminescent material can be arranged to emit light in the red region of the electromagnetic spectrum. This can be arranged by selection of a suitable persistent phosphorescent pigment. The photoluminescent material may emit in blue or green to yellow wavelengths. Alternatively the photoluminescent material may be selected to transmit light in red wavelengths, typically from 580 to 700 nm. Photoluminescent pigments may be a strontium aluminate, particularly a strontium aluminate doped with europium which have been found to be particularly suitable and to have advantageous charging profiles in the illumination available and to have suitable emission characteristics in order to provide the necessary emission strength and persistence properties. Alternative phosphorescent materials include: copper activated zinc sulfide.

Alternatively, the photoluminescent material may transmit in blue to yellow wavelengths. A colored film may be provided in the placard such that the icon is illuminated with photoluminescent emitted light. The colored film may be arranged to allow photoluminescent emitted light to transmit through the film. The colored film may be arranged to absorb light of wavelengths other than a desired color. Where a film is provided between the environment and the photoluminescent material the film is also arranged to transmit light in the region required to charge the photoluminescent material. In some embodiments, the icon is formed by a printed image that is surrounded by a clear portion such that the icon is illuminated as a silhouette. In this arrangement, the icon forms a negative image.

In another embodiment, the photoluminescent material is selected to transmit light in a blue to green wavelengths and the photoluminescent material further comprises a fluorescent dye that absorbs substantially all of the light wavelengths emitted by the photoluminescent material. The fluorescent dye is further selected to emit light in a different region of the electromagnetic spectrum. The fluorescent dye does not significantly absorb wavelengths in the region that charges the photoluminescent material and so does not prevent sufficient charging of the photoluminescent material. Further details of the light emitting material comprising a photoluminescent material and a fluorescent material can be found in our co-pending application: GB 1613415.7 and PCT/GB2017/052250, the whole contents of which applications are incorporated herein by reference.

The photoluminescent material is selected such that the icon has a contrast ratio of 1:10.

Figure 2:
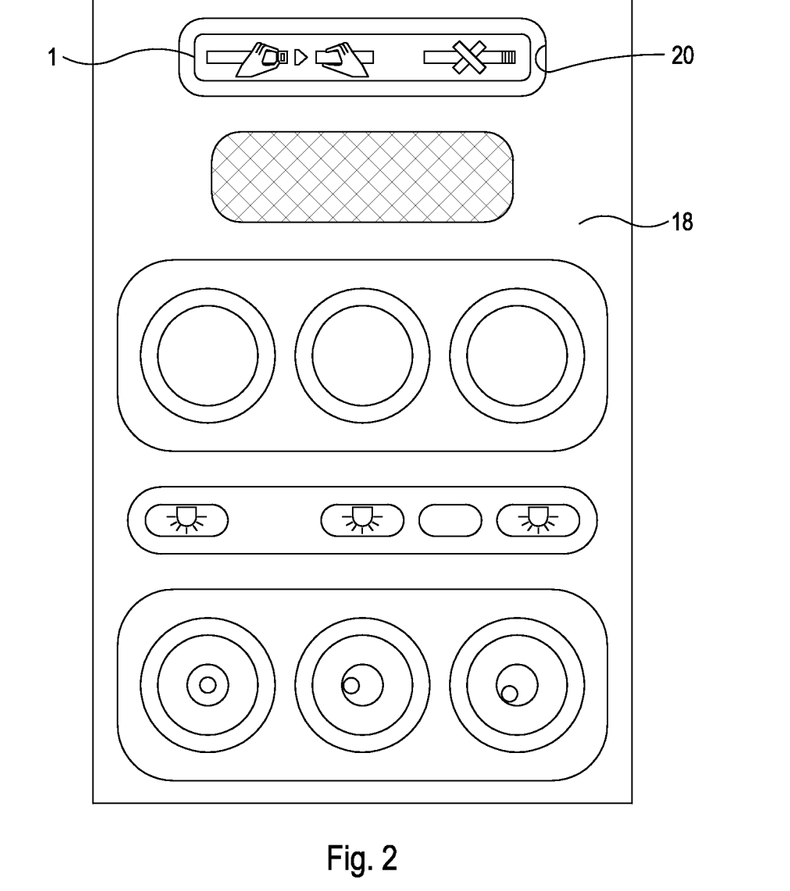
FIG. 2 is view of a placard fitted to a passenger service unit in an aircraft according to an exemplary embodiment.

Each placard 1 is arranged to connect to an existing passenger service unit 18 and is shaped to fit to a corresponding aperture 20. The shape of the placard 1 is such that it fits into the passenger service unit 18 and cooperates with existing securing means adjacent the aperture 20. The placard is shaped such that it cooperates with an existing passenger service unit and can be clipped into place instead of a conventional placard.

The placard is arranged to be at least tamper resistant and preferably tamper proof.

At least the outer surface is scratch resistant.

Figure 3:
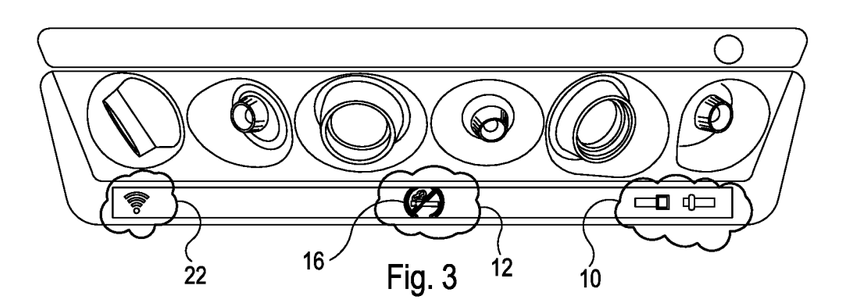
FIG. 3 is an alternative image of a placard in position in a passenger service unit according to an exemplary embodiment.

FIG. 3 is a view of a placard in accordance with an exemplary embodiment in position in a passenger service unit. The placard comprises a first signage area 10 comprising a "fasten seat belt" sign and a switchable low energy illumination means 11 is located in the PSU to illumination this sign in the conventional way. A second signage area 12 comprises a "no-smoking" sign and the "no-smoking" sign is illuminated by photoluminescent material provided behind the icon. A further signage area 22 is provided and illuminated by a switchable illumination means which is preferably low energy. The further signage area 22 in this case comprises an icon indicating that "WiFi" is available.

As is illustrated in FIG. 3, the placard can be retrofitted to an existing passenger service unit and is dimensioned to replace existing placards. The first and any further signage areas are located to be adjacent to locations of existing bi-pin sockets so that the signage areas can be switchable by the aircraft crew in a conventional manner.

Figure 4:
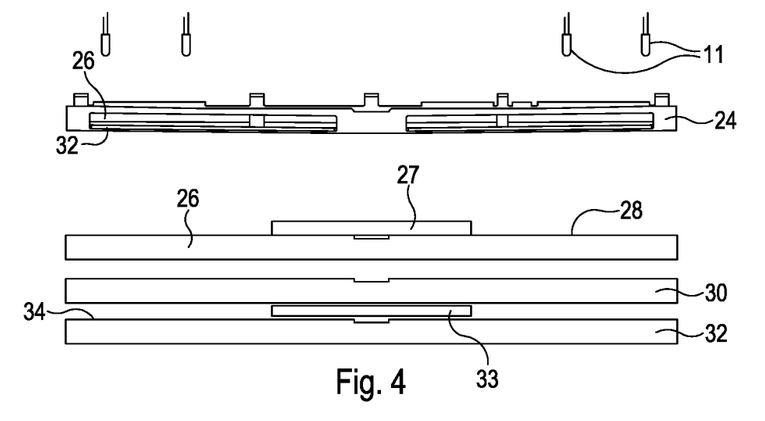
FIG. 4 is exploded view of a clip and the layers of a placard according to an exemplary embodiment.

FIG. 4 is an exploded view of a placard and clip in accordance with an exemplary embodiment. The clip comprises a frame 24 in which first and second plastic sheets are located forming sublayers of the placard. This frame 24 holds the placard in place in an aperture in the passenger service unit of an aircraft. The placard comprises a first layer comprising a plastic sheet 26 located to the rear of the placard. The first sheet 26 comprises a diffuse sheet. A rear or inner surface 28 of the diffuse plastic sheet is screen printed with black ink. The black ink acts as a mask 27 to block light transmission from the LED unit connected to a bi-pin socket in the PSU. It will be appreciated that in some embodiments the blocking layer may be white.

It has been found to be advantageous to provide a white ink layer in alignment with the photoluminescent material to improve the performance of the photoluminescent material.

A layer of adhesive 30 connects the first diffuse sheet to a second plastic sheet 32 comprising a clear plastic sheet.

A number of layers of screen print are provided on a rear surface 34 of the second sheet 32. It will be appreciated that the layers of screen printed inks are selected to provide a desired icon color or color wash for airline branding. Providing a white ink layer may also increase vibrancy of any printed images on the placard.

A layer 33 of photoluminescent material is applied to the rear surface 34 of the second sheet 32. The photoluminescent material is charged by light transmitted through the translucent plastic sheet 32 from the environment. Light emitted from the photoluminescent material passes though the translucent portion and illuminates the safety icon. In use the photoluminescent material is sandwiched between the first and the second layers of plastic material.

It will be appreciated that the described embodiment is only one embodiment and that the skilled person may envisage alternative arrangements that use the inventive concept and fall within the scope of the claims.

In use the placard can be retrofitted to an existing passenger service unit by the following steps. An existing placard is removed from the passenger service unit. Optionally first and second existing light bulbs are removed from the passenger service unit and replaced with respective first and second low energy light emitting means such as an LED unit. The placard comprising a clip is inserted into the aperture and clipped in place over the LED units and within the aperture in the passenger service unit. The placard has a first signage area having a fasten seat belt icon and a second signage area having a no-smoking icon. The first signage area is illuminated by a first LED unit while the second signage area is illuminated by an area of photoluminescent material in the placard. The second signage area is permanently illuminated by the photoluminescent material. The placard has a further signage area with additional icons that are illuminated by the second LED unit in the passenger service unit.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An aircraft passenger service unit signage placard adapted to be retrofitted to a passenger service unit in an aircraft cabin, the placard comprising at least a first signage area and a second signage area, wherein the first signage area is arranged to be illuminated by a switchable illumination means in the passenger service unit and wherein the second signage area is arranged to be illuminated by a photoluminescent material, wherein the placard further comprises a first layer, a second layer, and the photoluminescent material provided on at least one of the first or second layers in the second signage area, the photoluminescent material being charged, in use, by light from the aircraft cabin environment, wherein the second signage area includes at least one icon configured to be illuminated by only the photoluminescent material such that the at least one icon is illuminated at all times during a flight, wherein the first signage area is configured to be illuminated by the switchable illumination means, and wherein the switchable illuminations means of the first signage area is separated from the second signage area by a masking layer such that the switchable illumination means does not illuminate the second signage area.

2. The placard of claim 1, further comprising a color modifier applied to the at least one of the first and second layers.

3. The placard of claim 2, wherein the color modifier is an ink wash screen printed onto a plastic sheet or a colored filter.

4. The placard of claim 1, wherein the photoluminescent material is one of:
   i) printed onto one of the first and second layers;
   ii) provided between the first layer and the second layer; or
   iii) co-extruded with one of the first and second layers.

5. The placard of claim 1, wherein the first layer is a diffuse plastic sheet and the second layer is a clear plastic sheet.

6. The placard of claim 5, wherein the photoluminescent layer is sandwiched between the first and second layers.

7. The placard of claim 1, wherein the photoluminescent material is selected to emit light having a color that is at least one of yellow, green, or blue.

8. The placard of claim 1, wherein the photoluminescent material comprises a photoluminescent pigment and a fluorescent dye.

9. The placard of claim 1, wherein the second signage area comprises at least a "no-smoking" icon.

10. The placard of claim 1, further comprising a further signage area.

11. The placard of claim 1, wherein the placard is arranged to be tamper-resistant.

12. A method of retrofitting signage in an aircraft passenger service unit comprising removing an existing placard and replacing it with a signage placard, the signage placard comprising at least a first signage area and a second signage area, wherein the first signage area is arranged to be illuminated by a switchable illumination means in the passenger service unit and wherein the second signage area is arranged to be illuminated by a photoluminescent material and wherein the signage placard further comprises a first layer, a second layer, and the photoluminescent material provided on at least one of the first or second layers in the second signage area, the photoluminescent material being charged, in use, by light from the aircraft cabin environment, wherein the second signage area includes at least one icon configured to be illuminated by the photoluminescent material such that the at least one icon is illuminated at all times during a flight, wherein the first signage area is configured to be illuminated by the switchable illumination means, and wherein the switchable illuminations means of the first signage area is separated from the second signage area by a masking layer such that the switchable illumination means does not illuminate the second signage area.

13. The method of claim 12, wherein the signage placard comprises a clip arranged to cooperate with an aperture in the passenger service unit.

14. The method of claim 12, wherein the method further comprises replacing a lighting unit in the passenger service unit with a low energy illumination means.

15. The method of claim 14, wherein the low energy illumination means comprises at least one LED unit.

16. The method of claim 14, wherein the low energy illumination means is arranged to do at least one of the following:
   a) illuminate the at least one icon directly;
   b) illuminate the at least one icon indirectly;
   c) provide a back light to illuminate the at least one icon; or
   d) provide light to a light guide arranged to illuminate the at least one icon.

* * * * *